3,228,795
PROCESS FOR FORMING ELECTRODES FOR
ALKALINE STORAGE BATTERIES
Karl Ackermann, Mannheim, Germany, assignor to
Badische Anilin- & Soda-Fabrik Aktiengesellschaft,
Ludwigshafen (Rhine), Rhineland-Pfalz, Germany
No Drawing. Filed July 25, 1962, Ser. No. 214,160
Claims priority, application Germany, Aug. 4, 1961,
B 63,518
4 Claims. (Cl. 136—29)

The present invention relates to a process for the production of electrodes for alkaline storage batteries, especially to electrodes consisting of electrochemically inactive grids, the pores of which contain the active material.

Alkaline storage batteries with electrodes consisting of an electrochemically inactive grid in whose pores the active material is supported, have recently found wide application in specialized fields. Porous plates obtained by sintering nickel powder are employed as the positive electrodes in these storage batteries. The active material in the pores consists essentially of nickel hydroxide; this should be uniformly distributed over the whole cross-section of the plate. In order to introduce the active material into the pores, the porous plates are immersed in a concentrated solution of a nickel salt, for example, a nickel nitrate solution, according to the processes described in British patent specifications Nos. 331,540 and 487,607. The nickel is then precipitated as nickel hydroxide by means of caustic alkali. The plates are finally washed with water and dried. These processes must be repeated several times in order to impart adequate capacity to the electrodes.

It is an object of the present invention to provide a simpler method for the production of the said type electrodes. It is a further object of the invention to provide a process for the production of the said electrodes in which the metal electrode grid itself can be utilized for the formation of the active material, i.e. it is unnecessary in the case of the positive electrode to supply a nickel nitrate solution from outside.

These and other objects and advantages of the invention are achieved by treating the electrode grid with an aqueous solution of a salt of a weakly basic metal and subsequently with an aqueous solution of an alkali metal hydroxide for the purpose of forming the active substance, and finally rinsing the electrode grid with water.

Suitable salts of weakly basic metals are the salts of zinc and chromium and especially those of aluminum, in particular aluminum nitrate. Aluminum nitrate is readily accessible, inexpensive, and has especially high activity. The basic aluminum compounds formed on the porous nickel electrode are readily soluble in alkali and can therefore be largely removed by washing in the subsequent treatment with alkaline solutions. Any residual aluminum compounds do not impair the activity of the electrode material. Electrodes are obtained by a single treatment with aluminum nitrate solution whose capacity is higher than that of similar electrodes which have been treated four times with nickel nitrate solution by the known method described above.

The salts and alkali solutions are advantageously employed in a concentration as high as possible. Thus, an aluminum nitrate solution containing 2 to 3 parts by weight of crystalline aluminum nitrate in 1 part of water is very suitable. Suitable alkali solutions include, for economic reasons, especially aqueous solutions of sodium or potassium hydroxide. Obviously, similar results can be achieved by using the hydroxides of other alkali metals.

The duration of the treatment for the achievement of optimum results depends on the salt employed and on the condition of the electrode grid, and may be several hours at room temperature. This time can be shortened by increasing the temperature.

It has been shown that the activation proceeds especially readily in the presence of anions with an oxidative effect as is the case when nitrates or chlorates of weakly basic metals are employed. Thus, aluminum chloride, for example, employed alone has only a moderate activating effect. This can, however, be increased by the addition of nitrate ions, for example, in the form of alkali metal nitrates.

The process according to the invention can also be combined with the known activation method using nickel nitrate solution. For this purpose nickel nitrate is simply added to the aluminum nitrate solution. A suitable solution contains, for example, 1.5 parts aluminum nitrate and 1.5 parts nickel nitrate in 1 part water. Cobalt nitrate is also suitable for this purpose together with or in place of nickel nitrate. In this modification of the invention the particular effect of the aluminum nitrate is not impaired by the presence of other nitrates and active material is formed through the action of the solution on the metal of the porous grid as well as introduced into the pores.

The invention will be further illustrated by, but is not limited to, the following examples, in which the parts specified are parts by weight.

*Example 1*

A porous plate, obtained by sintering nickel carbonyl powder, with a weight of 8 g. and dimensions 90 x 60 x 0.8 mm. is immersed for a short time in a solution containing 3 parts crystalline aluminum nitrate in 1 part water whose temperature is slightly raised. The plate whose pores have become filled with aluminum nitrate solution is then allowed to lie for several hours at room temperature outside the solution. The plate becomes warm after only a few minutes and small gas bubbles are developed on it. After about 5 hours the plate is placed for 1 hour in a hot aqueous concentrated potassium hydroxide solution. An intense odor of ammonia is observed. The plate is then rinsed several times with water and finally dried. The weight of the plate increases to 9.7 g. The increase in weight is due essentially to partial oxidation of the sintered nickel to nickel hydroxide. When employed as an electrode in an alkaline storage battery the plate has a capacity of 1 ampere-hour. A similar sintered plate, in the pores of which nickel hydroxide has been deposited in the known way by single impregnation with nickel nitrate solution and precipitation of the nickel with aqueous potassium hydroxide solution, shows an increase in weight of approximately 0.9 g. When employed as an electrode in a storage battery this plate has a capacity of only approximately 0.3 ampere-hour.

*Example 2*

A porous sintered nickel plate of weight 7 g. is treated as described in Example 1 with aluminum chlorate solution followed by potassium hydroxide solution. It is then rinsed with water and dried. The increase in weight is approximately 2 g. When employed as an electrode the plate has a capacity of 0.8 ampere-hour.

I claim:
1. A process for the production of electrodes for alkaline storage batteries, which comprises impregnating a porous metallic electrode grid consisting essentially of nickel with an aqueous solution of a salt of a metal selected from the group consisting of zinc, chromium and aluminum, the anion of said salt being selected from the group consisting of chlorate and nitrate, and subsequently with an aqueous solution of an alkali metal hydroxide to form said electrode, and finally rinsing said electrode with water.

2. A process as claimed in claim 1 wherein the cation of said salt is aluminum.

3. A process as claimed in claim 2 wherein said grid is impregnated simultaneously with said aluminum salt and a nitrate salt selected from the group consisting of nickel nitrate and cobalt nitrate.

4. A process for the production of electrodes for alkaline storage batteries, which process comprises impregnating a porous metallic electrode grid consisting essentially of nickel with an aqueous solution containing cations selected from the group of zinc, chromium and aluminum and anions selected from the group consisting of chlorate and nitrate and subsequently with an aqueous solution of an alkali metal hydroxide to form said electrode and rinsing said electrode with water.

References Cited by the Examiner

UNITED STATES PATENTS

| | | | |
|---|---|---|---|
| 2,880,257 | 3/1959 | Murphy | 136—29 |
| 3,041,388 | 6/1962 | Fukuda et al. | 136—29 |

FOREIGN PATENTS

| | | |
|---|---|---|
| 232,193 | 9/1959 | Australia. |
| 526,352 | 6/1956 | Canada. |
| 613,025 | 1/1961 | Canada. |

JOHN H. MACK, *Primary Examiner.*